UNITED STATES PATENT OFFICE.

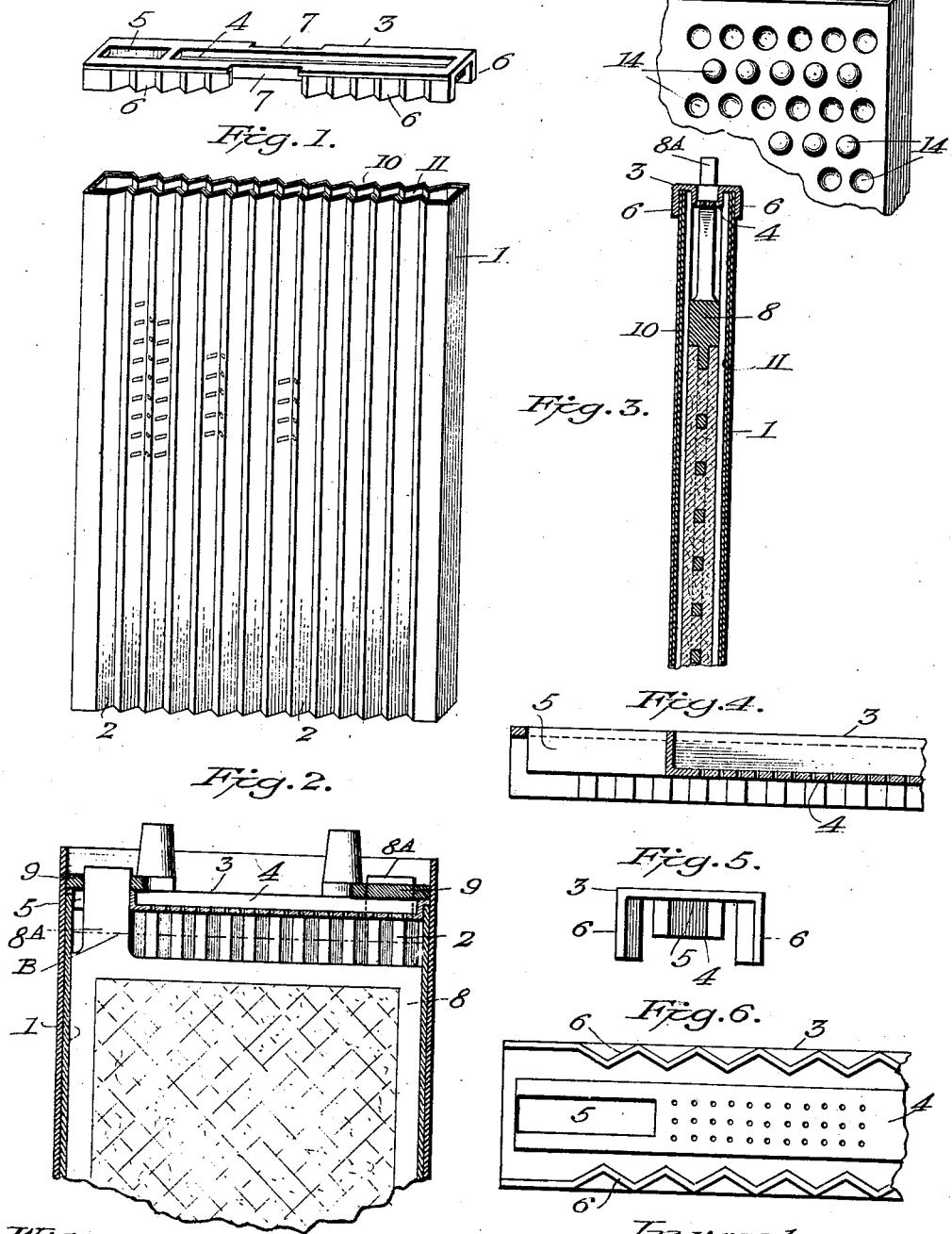

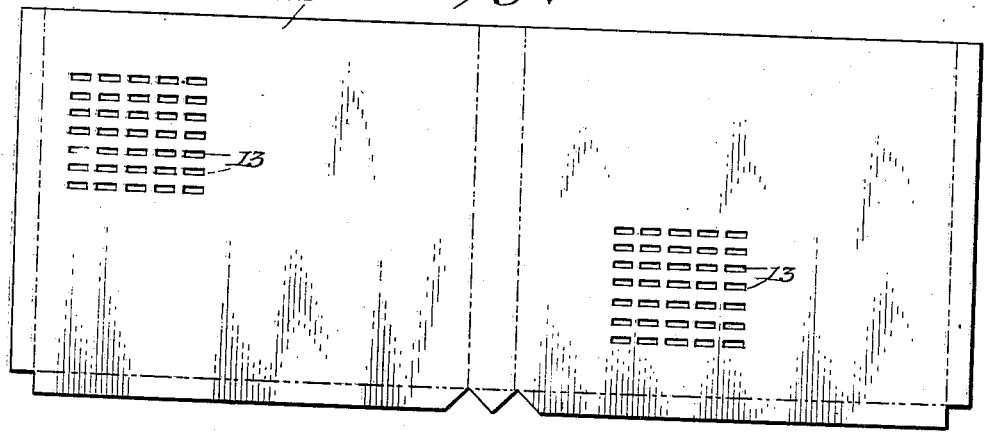
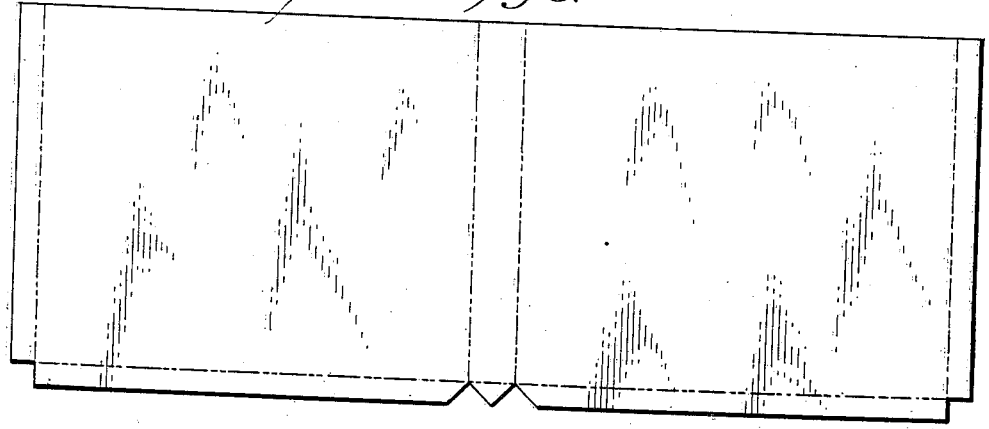
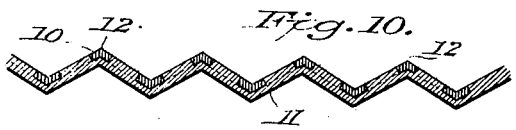

JASPER N. DAVIS, OF DENVER, COLORADO.

STORAGE-BATTERY SEPARATOR.

1,171,597.  Specification of Letters Patent.  Patented Feb. 15, 1916.

Application filed September 21, 1914. Serial No. 862,700.

*To all whom it may concern:*

Be it known that I, JASPER N. DAVIS, a citizen of the United States of America, residing in the city and county of Denver and State of Colorado, have invented a new and useful Storage-Battery Separator, of which the following is a specification.

This invention relates to improvements in storage battery separators.

The object of the invention is to provide a combined separator and envelop of non-conducting absorbent rigid material adapted to inclose the positive plates of each cell of a storage battery, the same being so constructed that ample space is provided for the free circulation of the solution between the positive and negative plates, the said envelop being also adapted to prevent any disintegrated active material of the plates from passing through its pores.

A further object is to construct an envelop of acid-proof material, thereby eliminating the possibility of short circuits frequently caused by split or deteriorated wood separators which are commonly used, a much longer life being obtained from a battery whose positive plates are inclosed in the envelop as above mentioned, the said envelop also entirely eliminating all the expense of removing short circuits and the necessity of frequent cleaning.

Having briefly outlined the object of my improved construction, I will proceed to describe the same in detail, reference being made to the accompanying drawings, in which is illustrated an embodiment thereof.

In these drawings Figure 1, is a perspective view of the improved envelop, the cap being removed. Fig. 2, is a sectional view of the upper portion of a battery cell, showing a plate inserted in the envelop and the plate connecting straps resting on the caps. Fig. 3, is an enlarged vertical, transverse sectional view of the upper portion of an envelop with the plate therein. Fig. 4, is a longitudinal sectional view of the end of the cap through which the plate lug passes. Fig. 5, is an end view of the portion of the cap shown in Fig. 4. Fig. 6, is an under side plan view of the portion of the cap shown in Fig. 4. Fig. 7 is a view of the rubber blank form which the envelop is formed. Fig. 8, is a view of the asbestos blank which forms a part of the envelop. Fig. 9, shows the two blanks together. Fig. 10, is a sectional view of a portion of the wall of an envelop after the rubber and asbestos members have been vulcanized and pressed into the required form; and Fig. 11, is a perspective view of a fragment of an envelop showing its sides provided with rows of inwardly and outwardly projecting indentations arranged in any manner or form desired.

The same reference characters indicate similar parts in all the views.

Referring to the accompanying drawings, the numeral 1 designates the envelop which is open at one end, the sides being zigzag or corrugated in cross sections to provide inner and outer vertical circulation passages 2, as shown in Fig. 1, the form thereof depending on whether thick, medium, or thin plates are used, said envelop being of greater depth than the length of the plate inserted therein.

The envelop is provided with a cover or cap 3, adapted to be placed down over its open end, this cap being shown in Fig. 1, just above the envelop. This cap has a depressed perforated portion 4 in the center thereof extending from one end to an opening 5 near the other end, through which opening the connecting lug 8ᴬ of the plate 8 passes when the plate is placed in the envelop. This depressed perforated portion 4 of the cap forms a brace between the inner sides of the envelop holding them out in position, when the said cap is placed upon the envelop. The cap has on each side a downwardly extending flange 6, which is also corrugated to conform to the corrugated sides of the envelop, and these flanges act in conjunction with the depressed portion 4 to hold the sides of the envelop in position. These side flanges do not extend the full length of the cap, a space or gap 7 being left at their center portion, the object of which is to permit the insertion of a hydrometer tube in between the envelops to make acid test readings.

The relative positions of the side flanges 6 and the center depressed portion 4 of the cap is clearly shown in Figs. 4 and 5. The bottom view, Fig. 6, also shows the space between the center perforated portion 4 and the outer flanges 6, between which the sides of the envelop are held in position. The opening 5 in the depressed portion 4, through which the plate connecting lug 8ᴬ passes, is clearly shown in Fig. 6.

The sectional view, Fig. 3, shows a plate in an envelop with the cap in position and the plate connecting lug 8ᴬ extending out through the cap.

In Fig. 2 is shown a sectional view of a cell and envelop illustrating the relative position of the envelop, the cap 3, the cell plate 8, and the plate straps 9 which connect the positive and negative plates. When the cell is assembled with this form of envelop, the connecting straps 9 rest firmly down on the envelop caps, holding them in place upon the envelops.

In Fig. 11 is illustrated a modification of the envelop in which the sides thereof are provided with inwardly and outwardly projecting indentations 14, which are arranged in alternate rows, the indentations being concavo-convex in cross section, this arrangement serving the same function as that provided by the corrugations shown in the other views. In the manufacture of this envelop, a thin sheet of perforated unvulcanized rubber 10 shown in Fig. 7, and a chemically pure thin sheet of asbestos 11 shown in Fig. 8, are used, or if desired sheets of asbestos may be used, between which is placed a sheet of unvulcanized perforated rubber. I preferably employ however an inner sheet of asbestos, and an outer sheet of perforated unvulcanized rubber. When thin sheets of asbestos are used, as shown in Fig. 8, they are folded over a form of required size and shape, with the adjoining edges cemented, and over this sheet is placed the perforated unvulcanized rubber with the adjoining ends cemented and prepared to be vulcanized, then under pressure the rubber and asbestos are pressed to the required shape and vulcanized, which will give a finished envelop, or an asbestos envelop may be molded under pressure to the required form and size and placed in a vulcanizing mold of the same form and size with the unvulcanized rubber placed over it and the rubber prepared for vulcanizing and vulcanized under pressure to a finished envelop as before.

When only one sheet of asbestos and one sheet of unvulcanized rubber are used, they appear when placed together and before vulcanizing as in Fig. 9. Fig. 10 shows a section of the two sheets as they appear after the asbestos and rubber have been vulcanized and pressed together and the envelop formed to shape. The perforations in the rubber may be of any design. I prefer however to perforate them rectangular in shape and they are so spaced in uniform rows that when the envelop is made, the apexes become the solid parts of the corrugations of the rubber, which forms the corresponding alternate inner and outer corrugations of the asbestos of the envelop, as shown at Fig. 10. At these points the envelop is strengthened by the said solid parts of the rubber between the perforations, and the asbestos is protected from being punctured by being pressed against the plate in the envelop. The perforations 13 occur between the bracing points or apexes 12, and therefore give a free circulation through them of the acid between the positive and negative plates through the pores of the asbestos.

The cap shown in the drawings does not necessarily need to be sealed to the envelop, my object being to construct an envelop and cap of which the open end of the envelop and the cap extends above the electrolyte or battery solution, the top of the caps abutting against the underneath side of the plate connecting straps, and by this construction the disintegrated active material which loosens from the positive plate in the envelops cannot be washed out of the envelop by the electrolyte, because the open ends of the envelops extend out above the surface of the electrolyte, as shown in Fig. 2, the surface of the electrolyte being shown at B, nor can the gassing bubbles carry away the said disintegrated active material, because the perforations in the cover of the cap are so small that they stop the spraying bubbles, which drop back; therefore the disintegrated active material cannot get out of the envelop and remains in contact with the plates in the envelop, thereby maintaining the capacity of the plates and prolonging the life of the battery.

Having described my invention, what I claim as new and desire to secure by Letters Patent, is:

1. In storage battery separator construction, an envelop of suitable material, open at one end, the sides of which are formed with interior and exterior vertical corrugations, and a cap for said envelop having corrugated side flaps, portions of which are omitted at the center, and a depressed perforated portion adapted to extend into the end of the envelop, said depressed portion having an opening at one end.

2. In storage battery separator construction, an envelop open at one end, comprising a member of suitable non-conducting perforated materials and a member of suitable absorbent material pressed together and formed with inner and outer vertical corrugations, and a cap therefor having depending corrugated side flanges, portions of which are omitted at the center, and a depressed perforated portion having an aperture at one end thereof, said depressed portion being adapted to fit within the end of the envelop.

3. In storage battery separator construction, an envelop open at one end and comprising an outer layer of non-conducting non-absorbent perforated material, and an inner layer of absorbent acid-proof material, the sides of said envelop being formed with inner and outer vertical corrugations, and a cap of suitable material for said envelop, having depending side flanges, the central portions of which are omitted, said cap having a depressed perforated portion adapted to extend into the end of the envelop, and an opening at one end.

4. In storage battery separator construction, an envelop open at one end and comprising an outer layer of perforated hard rubber and an inner layer of asbestos, said layers being pressed to form inner and outer vertical corrugations, and a cap of suitable material for said envelop, having corrugated side flanges, portions of which are omitted midway of their length, and a depressed perforated portion adapted to extend into the end of the envelop, said cap having an aperture at one end.

5. In storage battery separator construction, an envelop open at one end and comprising an outer layer of non-conducting, non-porous perforated material, and an inner layer of acid-proof porous material, said layers being pressed together to form inner and outer longitudinal corrugations, and a cap for said envelop, having corrugated side members, and a depressed perforated portion which fits in the envelop, the cap having an opening at one end.

6. In storage battery separator construction, the combination with a battery plate having a projecting lug, of an envelop therefor open at one end, comprising a layer of non-conducting non-porous perforated material, and a layer of acid-proof porous material, said layers being pressed together to form inner and outer corrugations, and a cap for said envelop having depending side flanges, portions of which are omitted at their centers, and a depressed perforated portion adapted to extend into the end of the envelop, having an opening at one end to receive the said projecting lug, said envelop being of greater depth than the height of the plate, whereby a space is left between the top of the plate and the depressed portion of the said cap.

In testimony whereof I affix my signature in presence of two witnesses.

JASPER N. DAVIS.

Witnesses:
  Mary E. Davis,
  Ida L. Davis.